United States Patent
Xu et al.

(10) Patent No.: US 12,481,550 B2
(45) Date of Patent: *Nov. 25, 2025

(54) DEVICE AND METHODS FOR MANAGING THE DATA INTEGRITY OF READ AND WRITE OPERATIONS

(71) Applicant: Lemon Inc., Grand Cayman (KY)

(72) Inventors: Peng Xu, Los Angeles, CA (US); Fei Liu, Los Angeles, CA (US); Kyoungryun Bae, Los Angeles, CA (US); Hao Wang, Los Angeles, CA (US); Ming Lin, Los Angeles, CA (US); Wei Tang, Los Angeles, CA (US); Sheng Qiu, Los Angeles, CA (US); Yang Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,524

(22) Filed: Feb. 20, 2024

(65) Prior Publication Data

US 2024/0248794 A1    Jul. 25, 2024

(51) Int. Cl.
*G06F 11/00* (2006.01)
*G06F 11/10* (2006.01)

(52) U.S. Cl.
CPC ...... *G06F 11/1004* (2013.01); *G06F 11/1068* (2013.01)

(58) Field of Classification Search
CPC ............. G06F 11/1004; G06F 11/1016; G06F 11/1076; G06F 11/1064; G06F 11/1068; G06F 11/1629; G06F 11/28
See application file for complete search history.

(56) References Cited

U.S. PATENT DOCUMENTS

| | | | | |
|---|---|---|---|---|
| 9,823,960 | B2* | 11/2017 | Wang | H03M 13/09 |
| 10,389,481 | B2* | 8/2019 | Ren | H04L 1/08 |
| 10,922,167 | B2* | 2/2021 | Her | G06F 9/30101 |
| 11,018,693 | B2* | 5/2021 | Meier | G06F 21/64 |
| 11,295,036 | B2* | 4/2022 | Young | H04L 63/12 |

(Continued)

OTHER PUBLICATIONS

European Patent Office, Extended European Search Report Issued in Application No. 24222325.3, Jun. 2, 2025, Germany, 10 pages.

*Primary Examiner* — Esaw T Abraham
(74) *Attorney, Agent, or Firm* — Alleman Hall & Tuttle LLP

(57) ABSTRACT

A computing device for verifying data integrity is provided, comprising a memory controller configured to receive a plurality of original data blocks. Each original data block has an associated initial CRC value. The memory controller then segments and recombines the received data blocks into logic blocks, and calculates a new logic block CRC value for each logic block. The logic blocks are transmitted with their respective new logic block CRC values to a storage device, and the logic blocks are written to non-volatile memory of the storage device in a write operation. After the write operation, a combined CRC value is calculated for the logic blocks and a combined CRC value for the original data blocks, and compare the combined CRC values. The memory controller determines whether the combined CRC values match. When they match, the memory controller generates a verification response verifying the integrity of the write operation.

20 Claims, 5 Drawing Sheets

(56) References Cited

U.S. PATENT DOCUMENTS

| | | | |
|---|---|---|---|
| 11,309,994 B2* | 4/2022 | Jain | H04L 1/0061 |
| 2007/0260623 A1 | 11/2007 | Jaquette et al. | |
| 2017/0322878 A1* | 11/2017 | Wang | G06F 11/1076 |

* cited by examiner

READ OPERATION INTEGRITY CHECK

DEVICE AND METHODS FOR MANAGING THE DATA INTEGRITY OF READ AND WRITE OPERATIONS

BACKGROUND

In the field of computing, the integrity of data during read and write operations to storage devices is critical in the design of storage systems. The preservation of data without corruption or alteration is paramount, as any instance of data corruption can lead to significant operational and financial consequences. Despite the importance of data integrity, achieving absolute prevention of data corruption is extremely challenging, primarily due to software and hardware issues.

Software components, ranging from applications and drivers to operating systems, can inadvertently cause memory corruption. In Direct Memory Access (DMA) technology, which is extensively utilized in contemporary storage systems, the transfer of data through a DMA engine, a hardware module, bypasses traditional processor operations. Consequently, several software-based methods for memory address space protection become ineffective. A malfunction in software or hardware leading to an incorrect address can result in data being transferred to an unanticipated location, making the debugging process particularly challenging as the processor does not execute these transfers. Furthermore, Dynamic Random-Access Memory (DRAM) is prone to a low probability of unintended bit flips, which can lead to data corruption.

In the storage industry, Cyclic Redundancy Check (CRC) is the predominant method for checking data integrity. CRC protection allows an application to verify the data payload and its corresponding CRC at any given time to ensure consistency. Data corruption is identified when a CRC mismatch occurs.

However, the implementation of CRC protection faces several challenges. There may exist gaps in the data path during data transfer or storage, creating a window of vulnerability where data corruption can occur. Moreover, employing the processing hardware to calculate CRC values consumes significant processing resources.

SUMMARY

In view of the above, a computing device for managing data integrity is provided. The computing device comprises a memory controller configured to receive a plurality of original data blocks. Each original data block has an associated initial CRC value. The memory controller then segments and recombines the received data blocks into logic blocks, and calculates a new logic block CRC value for each logic block. The logic blocks are transmitted with their respective new logic block CRC values to a storage device, and the logic blocks are written to non-volatile memory of the storage device in a write operation. After the write operation, the memory controller calculates a combined CRC value for the logic blocks and a combined CRC value for the original data blocks, and compare the combined CRC values. The memory controller determines whether the combined CRC values match. Responsive to determining that the combined CRC values match, the memory controller generates a verification response verifying the integrity of the write operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In view of the above issues, the present disclosure describes a device and method for managing the data integrity of data blocks that are written to non-volatile memory of a storage device.

Figure 1:
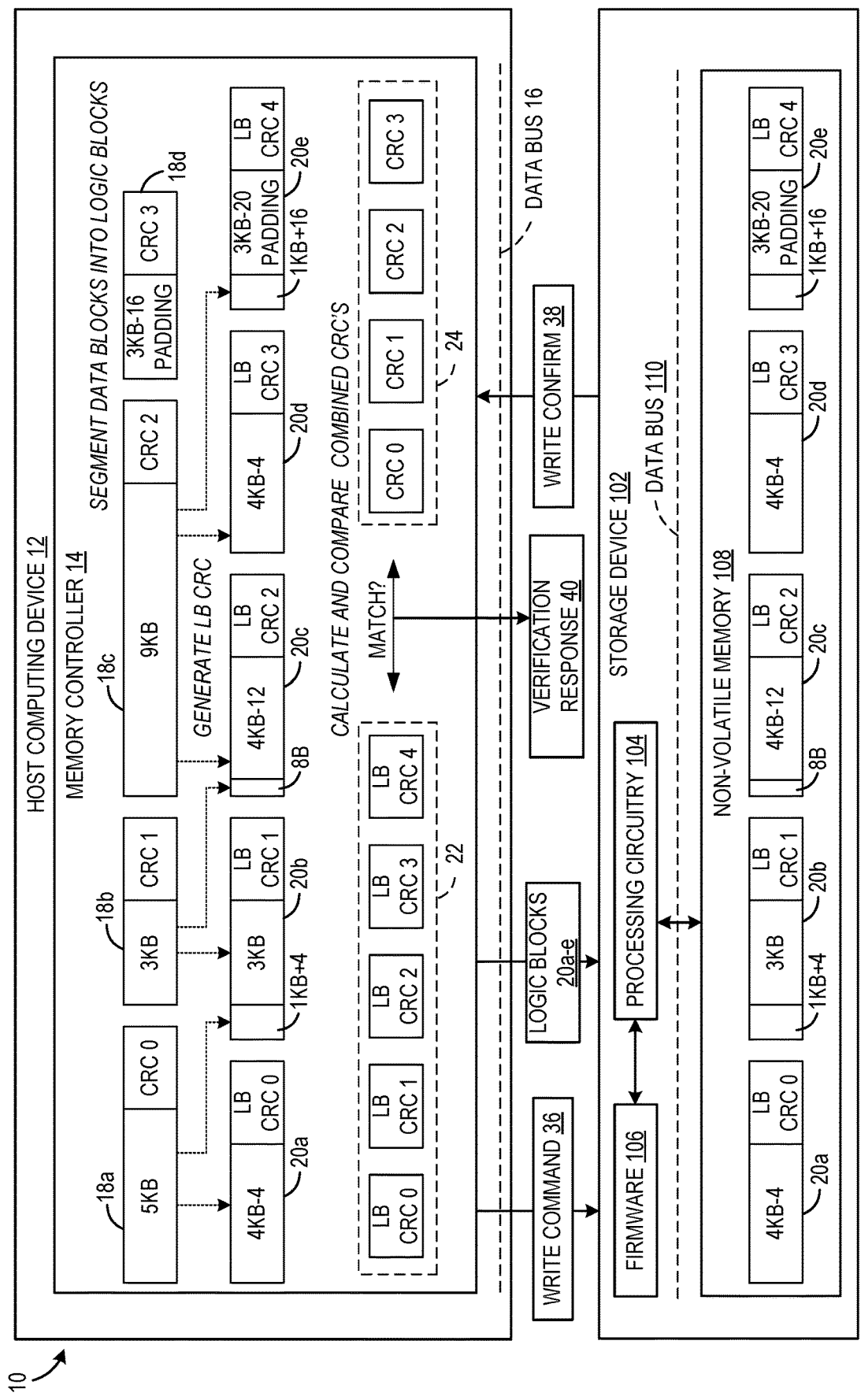
FIG. 1 illustrates a schematic view of a computing system for managing the data integrity of a write operation according to an example of the present disclosure.

Referring to FIG. 1, a computing system 10 comprises a host computing device 12 including a memory controller 14 configured to receive a plurality of original data blocks for writing to a storage device 102. In this example, four original data blocks 18*a-d* are initially received. Each original data block has an associated initial CRC value. The first block 18*a* is 5 KB in size and includes an associated CRC value, CRC 0. The second block 18*b* is 3 KB in size and includes an associated CRC 1. The third block 18*c* is 9 KB in size and includes an associated CRC 2. The fourth block 18*d* is a 3 KB padding and includes an associated CRC 3.

CRC values are calculated using CRC algorithms which function by treating the packet of data to be transmitted or stored as a large polynomial, represented by a binary number. The data is divided by a predetermined, fixed binary divisor, known as the generator polynomial. The remainder of this division, which is the CRC value, is then appended to the data.

To perform read and write operations, the memory controller 14 may implement the Non-Volatile Memory Express (Novem) protocol, which is used in the operation of solid-state drives (SSDs) utilizing PCIe interfaces. Alternatively, the memory controller 14 may implement other interfaces including SATA (serial ATA) or SAS (serial Attached SCSI). The memory controller 14 may also be implemented in enterprise storage solutions, including RAID (Redundant Array of Independent Disks) systems and network-attached storage (NAS) units.

Following receipt of the original data blocks 18*a-d*, the memory controller 14 segments and/or recombines the data blocks 18*a-d* into logic blocks 20*a-e* suitable for writing to the storage device 102. The memory controller 14 may segment the data blocks 18*a-d* into different sizes before recombining them into the logic blocks 20*a-e*. In this example, the first block 18*a* of 5 KB is split into a first segment of 4 KB which is incorporated into the first logic block 20*a* and a 1 KB segment which is incorporated into the second logic block 20*b*. The second data block 18*b* of 3 KB is split into a third segment of 3 KB which is incorporated into the second logic block 20*b* and a fourth segment of 8B which is incorporated into the third logic block 20*c*. The third data block 18*c* of 9 KB is split into a fifth segment of 4 KB which is incorporated into the third logic block 20*c*, a sixth segment of 4 KB which is incorporated into the fourth logic block 20*d*, and a seventh segment of 1 KB which is incorporated into the fifth logic block 20*e*. The eighth segment of 3 KB−16 padding from the fourth data block 18*d* is incorporated into the fifth logic block 20*e*.

It will be appreciated that no CRC check is performed prior to segmentation. In other words, before the logic blocks 20*a-e* are generated, the CRC values for each data block 18*a-d* is not calculated to verify data integrity. Thus, the memory controller 14 omits a CRC check that is conventionally performed prior to segmentation.

The memory controller 14 subsequently calculates and attaches a new logic block CRC value to each logic block 20*a-e* after segmentation and recombination, performing single block CRC calculations for each logic block 20*a-e*. In this example, logic block (LB) CRC 0 is calculated and attached to the first logic block 20*a*, LB CRC 1 is calculated and attached to the second logic block 20*b*, LB CRC 2 is calculated and attached to the third logic block 20*c*, LB CRC 3 is calculated and attached to the fourth logic block 20*d*, and LB CRC 4 is calculated and attached to the fifth logic block 20*e*. It will be appreciated that this is the only step for which the memory controller 14 performs single block CRC calculations during the write operation.

The memory controller 14 transmits the data blocks 20*a-e*, along with their CRC values, to the storage device 102 in a write command 36 via a data bus 16. In accordance with the write command 36, the memory controller 14 writes the logic blocks 20*a-e* to the non-volatile memory 108 of the storage device 102.

The storage device 102 comprises processing circuitry 104, firmware 106, and a data bus 110 coupled to the processing circuitry 104 and the non-volatile memory 108. The processing circuitry 104 may be configured to execute a writing program to receive the write command 36, and execute the write command 36 on a given zone of the non-volatile memory 108. The processing circuitry 104 is a microprocessor, which can include an application specific integrated circuit (ASIC). The firmware 106 may be configured as permanent software programmed into a read-only memory of the storage device 102. In one particular example, the storage device 102 may be a rack mounted storage platform containing individual solid state drives.

Upon successful completion of the write operation, the storage device 102 sends a write confirmation 38, which may be a completion queue entry including details about the completed operation, such as a success status and any relevant identifiers. In Non-Volatile Memory Express (NVMe) and other high-performance storage interfaces, the completion queue entry consists of several Dwords, one or more of which may contain the write confirmation 38 including information regarding the status and result of the executed write command 36. For example, the write confirmation 38 may take the form of a specific set of bits within the first Dword (Dword 0) or the fourth Dword (Dword 3) indicating a command specific status, including a completion status and a phase bit to indicate whether the entry is new. The completion status may indicate the success of the write operation, types of errors encountered or other pieces of information about the completion of the write operation.

The memory controller 14 subsequently receives the write confirmation 38 from the storage device 102 after writing the logic blocks 20*a-e* to the non-volatile memory 108 of the storage device 102.

The memory controller 14 then combines the CRC values of each of the logic blocks 20*a-e* together to calculate a combined LB CRC value 22. Further, the memory controller 14 combines the CRC values of each of the original data blocks 18*a-d* together to calculate a combined data CRC value 24. The combination of the CRC values may be performed by initially concatenating the data blocks virtually, respecting their order. The CRC of this concatenated virtual data block is calculated using the same CRC algorithm and polynomial that were used to generate the CRC values for the original data blocks 18*a-d*, the logic blocks 20*a-e*, and the combined CRC values 22, 24.

The memory controller 14 then compares the LB CRC value 22 to the combined data CRC value 24 and determines whether the two CRC values match. Responsive to determining that the two CRC values match, the memory controller 14 generates and outputs a verification response 40 indicating that the integrity of the write operation is verified. Responsive to determining that the two CRC values 22, 24 do not match, the memory controller 14 generates and outputs a verification response 40 warning that a loss of integrity of the write operation is suspected.

Figure 2:
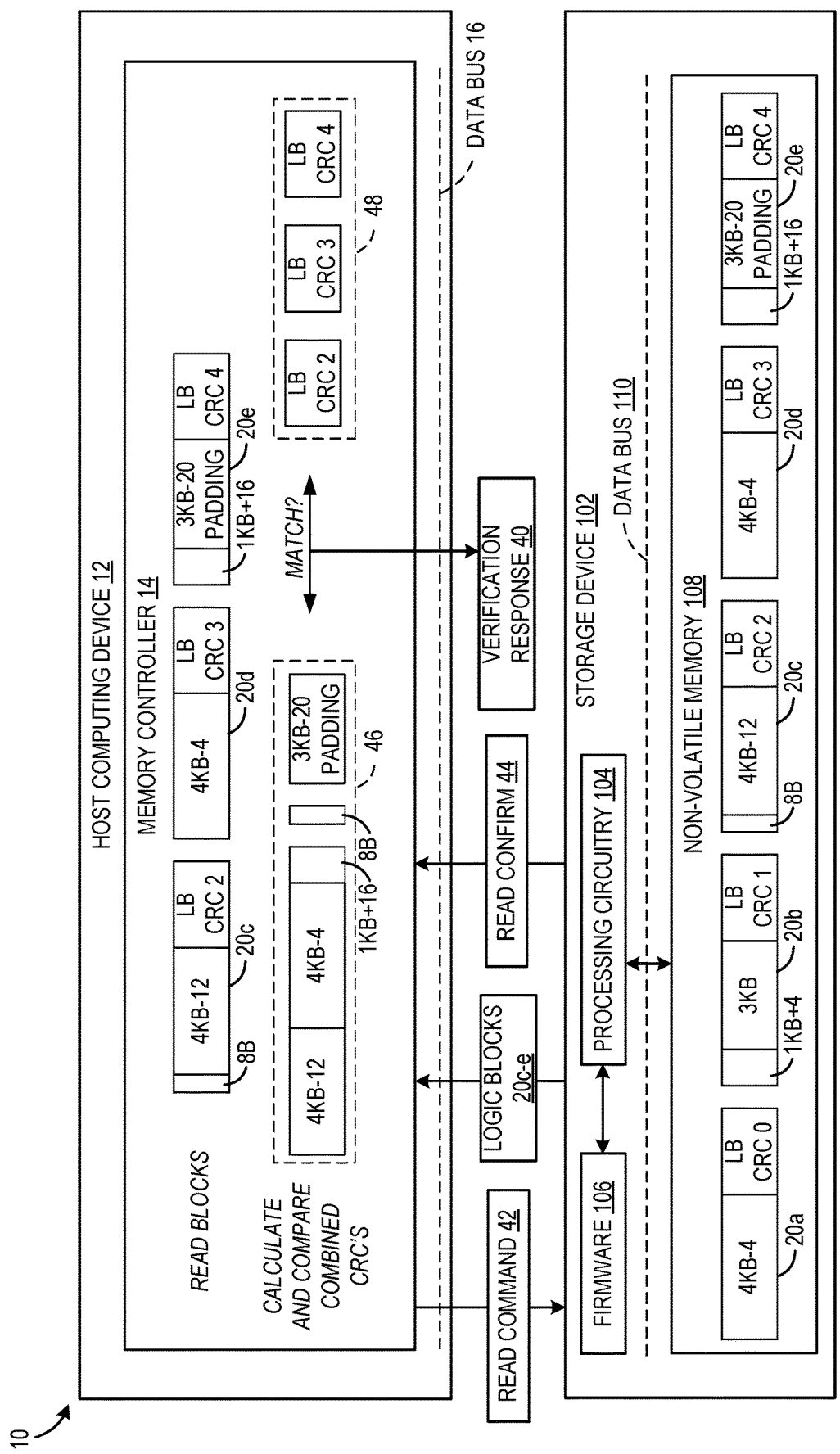
FIG. 2 illustrates a schematic view of a computing system for managing the data integrity of a read operation according to an example of the present disclosure.

Referring to FIG. 2, the read operation of the computing device 12 in reading logic blocks 20*c-e* from the non-volatile memory 108 of the storage device 102 is described in detail. The memory controller 14 initiates the read process by identifying the specific logic blocks 20*c-e* that are to be retrieved from the non-volatile memory 108 of the storage device 102. This identification is based on the current data requirements of the computing system 10, which may be influenced by user requests, application needs, or system processes.

Once the target logic blocks 20*c-e* are identified, the memory controller 14 issues a read command 42 to the storage device 102. This command includes the addresses or identifiers of the logic blocks 20*c-e* to be read. The read command 42 is transmitted via a data bus 16, which connects the memory controller 14 to the storage device 102. In NVMe devices, for example, the data bus 16 may be a PCIe bus.

Upon receiving the read command 42, the storage device 102 locates the specified logic blocks 20*c-e* within its non-volatile memory 108. The processing circuitry 104 may be configured to execute a read program to receive the read command 42, and execute the read command 42 on a given zone of the non-volatile memory 108. The storage device 102 then reads these logic blocks 20*c-e*, preparing them for transmission back to the memory controller 14.

The storage device 102 sends the retrieved logic blocks 20*c-e* back to the memory controller 14 over the data bus 110. This transmission includes not only the raw data or segments from the logic blocks but also the LB CRC values, which are used to verify data integrity.

Along with the logic blocks 20*c-e*, the storage device 102 sends a read confirmation 44 to the memory controller 14. This read confirmation 44 may include details about the success of the read operation, such as the status of the operation and any errors encountered. The read confirmation 44 ensures that the data has been correctly and completely retrieved from the non-volatile memory.

Responsive to receiving the logic blocks 20*c-e* and the read confirmation 44, the memory controller 14 performs a data integrity check. The memory controller 14 first strips the CRC values from each read logic block 20c-e, thereby isolating the raw data or data segments from the logic block CRC values.

The memory controller 14 calculates a CRC value for the very first segment of the very first logic block 20c read. In this specific example, the first logic block read is block 20c, and its first segment is an 8B segment. The memory controller 14 applies the CRC algorithm to this 8B segment to determine its CRC value.

Similarly, the memory controller 14 calculates a CRC value for the very last segment of the very last logic block 20e read, excluding the CRC values. In this case, the last segment is the 3 KB-20 padding from logic block 20e. The memory controller 14 applies the CRC algorithm to this 3 KB-20 padding to determine its CRC value.

The memory controller 14 then combines all other segments from all the read logic blocks 20c-e (excluding the first segment 8B and the last segment 3 KB-20 padding). In this instance, these segments include 4 KB-12, 4 KB-4, and 1 KB+16. The memory controller 14 calculates a CRC value for this combined middle segments set.

The memory controller 14 combines the three CRC values (from the first segment, the combined middle segments, and the last segment) to calculate a final combined segments CRC value 46, which is representative of the overall data integrity across all segments of the logic blocks 20c-e.

Concurrently, the memory controller 14 also combines the original CRC values LB CRC2, LB CRC 3, LB CRC 4 attached to all the logic blocks 20c-e read from the storage device 102 to generate a combined CRC value 48.

The memory controller 14 then compares the combined segments CRC value 46 to the combined CRC value 48 and determines whether the two CRC values match. Responsive to determining that the two CRC values match, the memory controller 14 generates and outputs a verification response 40 indicating that the integrity of the read operation is verified. This response 40 indicates that the data integrity of the read logic blocks 20c-e has been successfully verified, confirming that the data retrieved is accurate and unaltered. Responsive to determining that the two CRC values 46, 48 do not match, the memory controller 14 generates and outputs a verification response 40 warning that a loss of integrity of the read operation is suspected.

Accordingly, by meticulously calculating and comparing CRC values at different stages of the data reading process, the memory controller 14 may accurately confirm the reliability and accuracy of the data 20c-e retrieved from the storage device 102.

After confirming the integrity of the read logic blocks 20c-e, the memory controller 14 makes the retrieved logic blocks 20c-e available to the computing device 12. This may involve placing the data into system memory or passing it directly to the requesting application or process.

It will be appreciated that, in the read process, the memory controller 14 does not recalculate the attached CRC value for each read logic block 20c-e. For example, the memory controller 14 does not recalculate the CRC value LB CRC2 for logic block 20c by recalculating the CRC value for the combined segments 8B and 4 KB-12 in logic block 20c. For example for logic block 20c, the memory controller 14 does not recalculate the CRC value for the combined segments 8B and 4 KB-12 and then compare this CRC value with the LB CRC 2 value that was already attached to logic block 20c when the logic block 20c was read by the memory controller 14.

Figure 3:
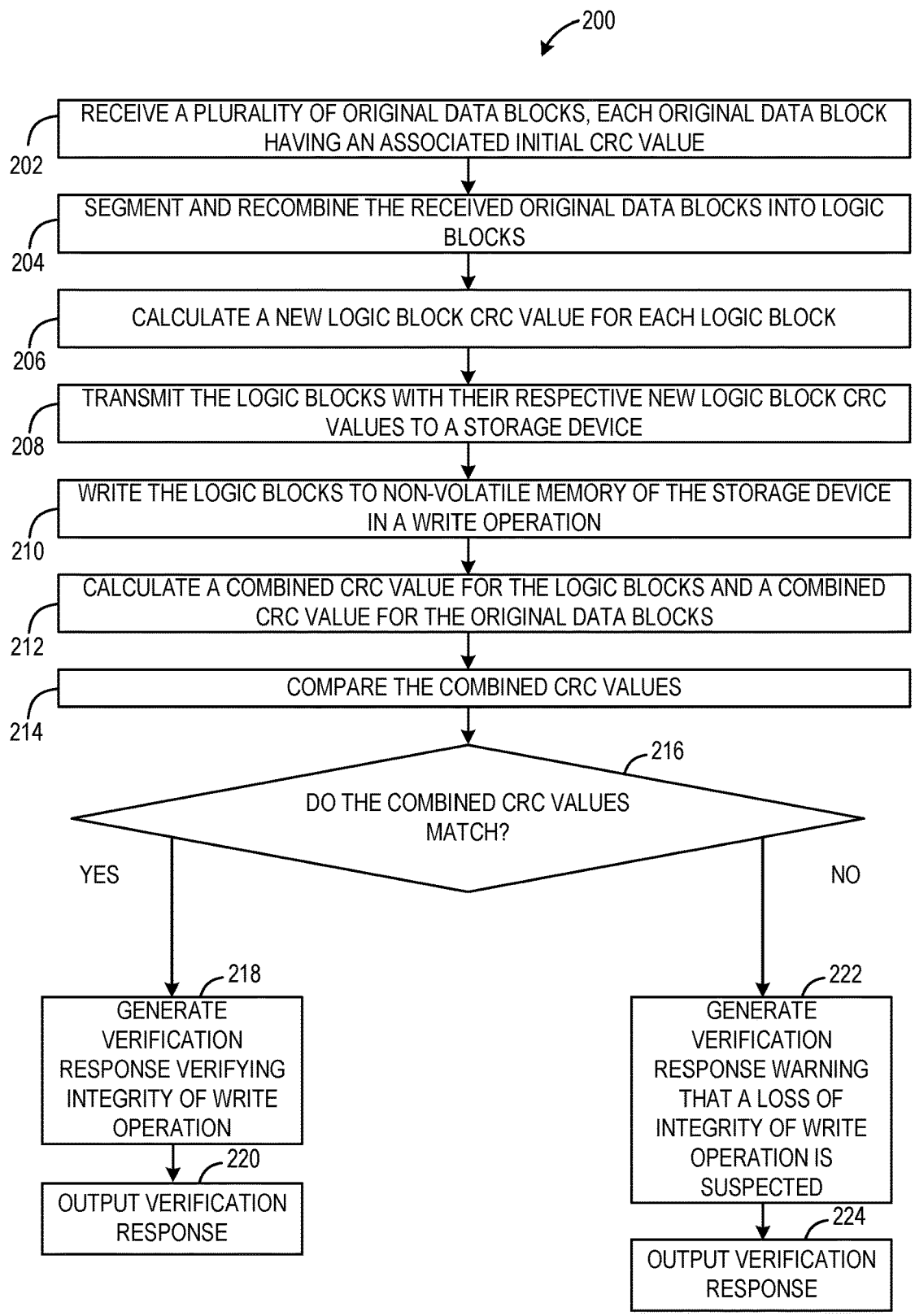
FIG. 3 is a flowchart of a first method for managing the data integrity of a write operation according to an example embodiment of the present disclosure.

FIG. 3 illustrates a flowchart of a computerized first method 200 for managing data integrity of a write operation writing data to the non-volatile memory of a storage device. The first method 200 may be implemented on the computing system 10 illustrated in FIG. 1 above, which include processing circuitry and associated memory configured to implement a memory controller. Alternatively, other suitable computing hardware and software may be utilized.

At 202, the method includes receiving a plurality of original data blocks, each original data block having an associated initial CRC value. At 204, the method includes segmenting and recombining the received original data blocks into logic blocks. At 206, the method includes calculating a new logic block CRC value for each logic block. At 208, the method includes transmitting the logic blocks with their respective new logic block CRC values to a storage device. At 210, the method includes writing the logic blocks to non-volatile memory of the storage device in a write operation. At 212, the method includes calculating a combined CRC value for the logic blocks and a combined CRC value for the original data blocks.

At 214, the method includes comparing the combined CRC values. At 216, the method includes determining whether the combined CRC values match. At 218, the method includes, responsive to determining that the combined CRC values match, generating a verification response verifying the integrity of the write operation. At 220, the method includes outputting the verification response. At 222, the method includes, responsive to determining that the combined CRC values do not match, generating a verification response warning that a loss of integrity of the write operation is suspected. At 224, the method includes outputting the generated verification response.

Figure 4:
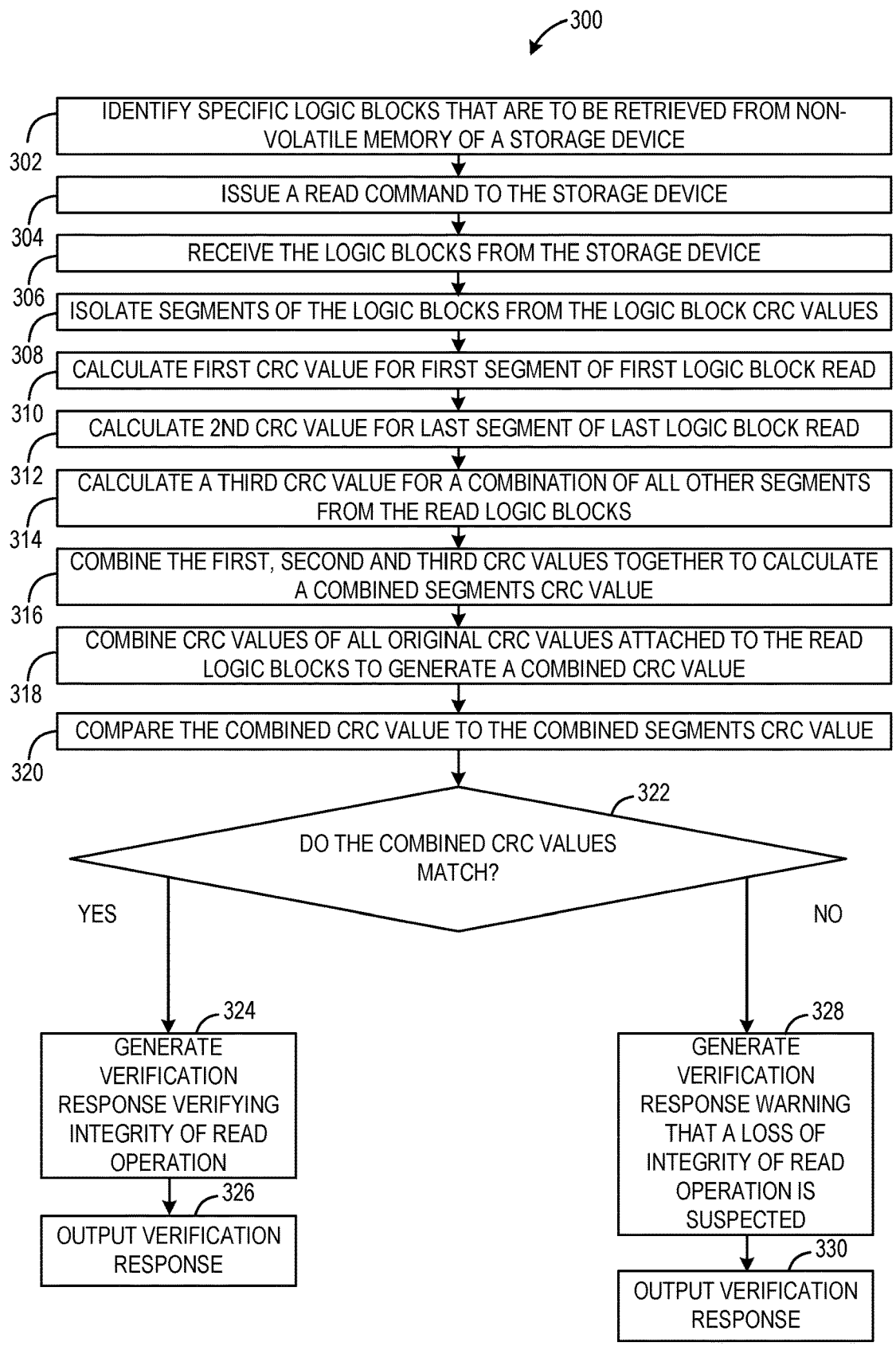
FIG. 4 is a flowchart of a first method for managing the data integrity of a read operation according to an example embodiment of the present disclosure.

FIG. 4 illustrates a flowchart of a computerized second method 300 for managing data integrity of a read operation reading data from the non-volatile memory of a storage device. The second method 300 may be implemented on the computing system 10 illustrated in FIG. 2 above, which include processing circuitry and associated memory configured to implement a memory controller. Alternatively, other suitable computing hardware and software may be utilized.

At 302, the method includes identifying specific logic blocks that are to be retrieved from non-volatile memory of a storage device. At 304, the method includes issuing a read command to the storage device. At 306, the method includes receiving the logic blocks from the storage device. At 308, the method includes isolating segments of the logic blocks from the logic block CRC values. At 310, the method includes calculating a first CRC value for a first segment of a first logic block read. At 312, the method includes calculating a second CRC value for a last segment of a last logic block read. At 314, the method includes calculating a third CRC value for a combination of all other segments from the read logic blocks.

At 316, the method includes combining the first, second and third CRC values together to calculate a combined segments CRC value. At 318, the method includes combining CRC values of all original CRC values attached to the read logic blocks to generate a combined CRC value. At 320, the method includes comparing the combined CRC value to the combined segments CRC value.

At 322, the method includes determining whether the combined CRC values match. At 324, the method includes, responsive to determining that the combined CRC values match, generating a verification response verifying the integrity of the read operation. At 326, the method includes outputting the verification response. At 328, the method includes, responsive to determining that the combined CRC values do not match, generating a verification response warning that a loss of integrity of the read operation is suspected. At 330, the method includes outputting the generated verification response.

The above-described system, device, and methods enhance data integrity in storage systems by providing a robust mechanism for verifying the integrity of data during read and write operations to storage devices. Redundant CRC calculations are minimized, and end-to-end data protection is ensured after the segmentation of original data blocks into logic blocks for writing operations, thereby ensuring high reliability and accuracy in data transfer and storage processes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
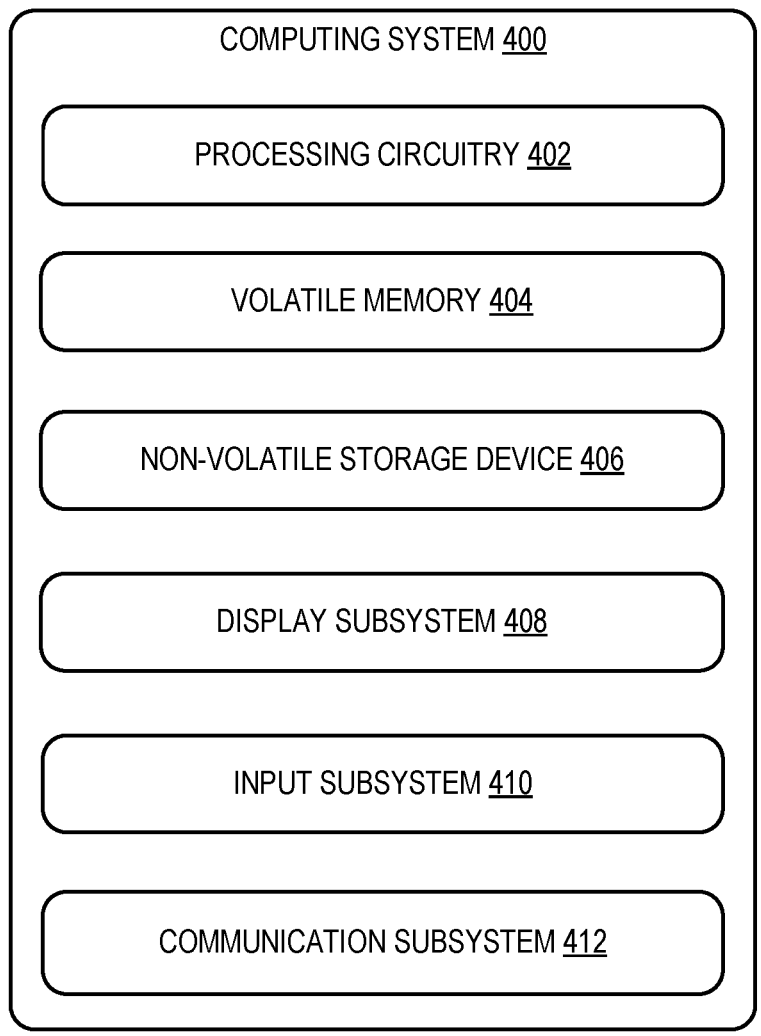
FIG. 5 shows an example computing environment of the present disclosure.

FIG. 5 schematically shows a non-limiting embodiment of a computing system 400 that can enact one or more of the methods and processes described above. Computing system 400 is shown in simplified form. Computing system 400 may embody the computing system 10 described above and illustrated in FIGS. 1 and 2. Components of computing system 400 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 may optionally include a display subsystem 408, input subsystem 410, communication subsystem 412, and/or other components not shown in FIG. 5.

Processing circuitry 402 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 402 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory, semiconductor memory, and/or magnetic memory, or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by processing circuitry 402 to temporarily store information during processing of software instructions. It will be appreciated that volatile memory 404 typically does not continue to store instructions when power is cut to the volatile memory 404.

Aspects of processing circuitry 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via processing circuitry 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with processing circuitry 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, camera, or microphone.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 400 to send and/or receive messages to and/or from other devices via a network such as the Internet.

The following paragraphs provide additional support for the claims of the subject application. One aspect provides a computing device for managing data integrity during a write operation, comprising a memory controller configured to receive a plurality of original data blocks, each original data block having an associated initial Cyclic Redundancy Check (CRC) value; segment and recombine the received original data blocks into logic blocks; calculate a new logic block CRC value for each logic block; transmit the logic blocks with their respective new logic block CRC values to a storage device; write the logic blocks to non-volatile memory of the storage device in the write operation; calculate a combined CRC value for the logic blocks and a combined CRC value for the original data blocks; compare the combined CRC values; determine whether the combined CRC values match; and responsive to determining that the combined CRC values match, generate and output a verification response verifying the integrity of the write operation. In this aspect, additionally or alternatively, the memory controller may perform single block CRC calculations for only one step during the write operation. In this aspect, additionally or alternatively, the memory controller may omit a CRC check prior to the segmentation of the data blocks. In this aspect, additionally or alternatively, the memory controller may implement Non-Volatile Memory Express (NVMe) protocol to perform the write operation. In this aspect, additionally or alternatively, the memory controller may further receive a write confirmation from the storage device after writing the logic blocks to the non-volatile memory of the storage device. In this aspect, additionally or alternatively, the write confirmation may be a completion queue entry. In this aspect, additionally or alternatively, the memory controller may combine CRC values of the logic blocks and the data blocks by concatenating the blocks virtually in their original order and calculating a CRC for the concatenated virtual block. In this aspect, additionally or alternatively, the memory controller may use the same CRC algorithm and polynomial for generating CRC values for the original data blocks, the logic blocks, and the combined CRC values.

Another aspect provides a computing device for managing data integrity during a read operation, comprising a memory controller configured to identify specific logic blocks that are to be retrieved from non-volatile memory of a storage device; issue a read command to the storage device; receive the logic blocks from the storage device; isolate segments of the logic blocks from the logic block Cyclic Redundancy Check (CRC) values; calculate a first CRC value for a first segment of a first logic block read; calculate a second CRC value for a last segment of a last logic block read; calculate a third CRC value for a combination of all other segments from the read logic blocks; combine the first, second and third CRC values together to calculate a combined segments CRC value; combine CRC values of all original CRC values attached to the read logic blocks to generate a combined CRC value; compare the combined CRC value to the combined segments CRC value; determine whether the two CRC values match; and responsive to determining that the combined CRC values match, generating a verification response verifying the integrity of the read operation. In this aspect, additionally or alternatively, the memory controller may combine CRC values of the logic blocks by concatenating the blocks virtually in their original order and calculating a CRC for the concatenated virtual block. In this aspect, additionally or alternatively, the memory controller may use the same CRC algorithm and polynomial for generating CRC values for the logic blocks and the combined CRC values. In this aspect, additionally or alternatively, the memory controller may not recalculate an attached CRC value for each read logic block.

Another aspect provides a computing method for managing data integrity during a write operation, comprising receiving a plurality of original data blocks, each original data block having an associated initial Cyclic Redundancy Check (CRC) value; segmenting and recombining the received original data blocks into logic blocks; calculating a new logic block CRC value for each logic block; transmitting the logic blocks with their respective new logic block CRC values to a storage device; writing the logic blocks to non-volatile memory of the storage device in the write operation; calculating a combined CRC value for the logic blocks and a combined CRC value for the original data blocks; comparing the combined CRC values; determining whether the combined CRC values match; and responsive to determining that the combined CRC values match, generating and outputting a verification response verifying the integrity of the write operation. In this aspect, additionally or alternatively, single block CRC calculations may be performed for only one step during the write operation. In this aspect, additionally or alternatively, a CRC check may be omitted prior to the segmentation of the data blocks. In this aspect, additionally or alternatively, a Non-Volatile Memory Express (NVMe) protocol may be implemented to perform the write operation. In this aspect, additionally or alternatively, the method may further comprise receiving a write confirmation from the storage device after writing the logic blocks to the non-volatile memory of the storage device. In this aspect, additionally or alternatively, the write confirmation may be a completion queue entry. In this aspect, additionally or alternatively, CRC values of the logic blocks and the data blocks may be combined by concatenating the blocks virtually in their original order and calculating a CRC for the concatenated virtual block. In this aspect, additionally or alternatively, the same CRC algorithm and polynomial may be used for generating CRC values for the original data blocks, the logic blocks, and the combined CRC values.

It will be appreciated that "and/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for managing data integrity during a write operation, comprising:
    a memory controller configured to:
        receive a plurality of original data blocks, each original data block having an associated initial Cyclic Redundancy Check (CRC) value;
        segment and recombine the received original data blocks into logic blocks;
        calculate a new logic block CRC value for each logic block;
        transmit the logic blocks with their respective new logic block CRC values to a storage device;
        write the logic blocks to non-volatile memory of the storage device in the write operation;
        calculate a combined CRC value for the logic blocks and a combined CRC value for the original data blocks;
        compare the combined CRC values;
        determine whether the combined CRC values match; and
        responsive to determining that the combined CRC values match, generate and output a verification response verifying the integrity of the write operation.

2. The computing device of claim 1, wherein the memory controller performs single block CRC calculations for only one step during the write operation.

3. The computing device of claim 2, wherein the memory controller omits a CRC check prior to the segmentation of the data blocks.

4. The computing device of claim 1, wherein the memory controller implements Non-Volatile Memory Express (NVMe) protocol to perform the write operation.

5. The computing device of claim 1, wherein the memory controller receives a write confirmation from the storage device after writing the logic blocks to the non-volatile memory of the storage device.

6. The computing device of claim 5, wherein the write confirmation is a completion queue entry.

7. The computing device of claim 1, wherein the memory controller combines CRC values of the logic blocks and the data blocks by concatenating the blocks virtually in their original order and calculating a CRC for the concatenated virtual block.

8. The computing device of claim 1, wherein the memory controller uses the same CRC algorithm and polynomial for generating CRC values for the original data blocks, the logic blocks, and the combined CRC values.

9. A computing device for managing data integrity during a read operation, comprising:
    a memory controller configured to:
        identify specific logic blocks that are to be retrieved from non-volatile memory of a storage device;
        issue a read command to the storage device;
        receive the logic blocks from the storage device;
        isolate segments of the logic blocks from the logic block Cyclic Redundancy Check (CRC) values;
        calculate a first CRC value for a first segment of a first logic block read;
        calculate a second CRC value for a last segment of a last logic block read;
        calculate a third CRC value for a combination of all other segments from the read logic blocks;
        combine the first, second and third CRC values together to calculate a combined segments CRC value;
        combine CRC values of all original CRC values attached to the read logic blocks to generate a combined CRC value;
        compare the combined CRC value to the combined segments CRC value;
        determine whether the two CRC values match; and
        responsive to determining that the combined CRC values match, generating a verification response verifying the integrity of the read operation.

10. The computing device of claim 9, wherein the memory controller combines CRC values of the logic blocks by concatenating the blocks virtually in their original order and calculating a CRC for the concatenated virtual block.

11. The computing device of claim 9, wherein the memory controller uses the same CRC algorithm and polynomial for generating CRC values for the logic blocks and the combined CRC values.

12. The computing device of claim 9, wherein the memory controller does not recalculate an attached CRC value for each read logic block.

13. A computing method for managing data integrity during a write operation, comprising:
    receiving a plurality of original data blocks, each original data block having an associated initial Cyclic Redundancy Check (CRC) value;
    segmenting and recombining the received original data blocks into logic blocks;
    calculating a new logic block CRC value for each logic block;
    transmitting the logic blocks with their respective new logic block CRC values to a storage device;
    writing the logic blocks to non-volatile memory of the storage device in the write operation;
    calculating a combined CRC value for the logic blocks and a combined CRC value for the original data blocks;
    comparing the combined CRC values;
    determining whether the combined CRC values match; and
    responsive to determining that the combined CRC values match, generating and outputting a verification response verifying the integrity of the write operation.

14. The computing method of claim 13, wherein single block CRC calculations are performed for only one step during the write operation.

15. The computing method of claim 14, wherein a CRC check is omitted prior to the segmentation of the data blocks.

16. The computing method of claim 13, wherein a Non-Volatile Memory Express (NVMe) protocol is implemented to perform the write operation.

17. The computing method of claim 13, further comprising receiving a write confirmation from the storage device after writing the logic blocks to the non-volatile memory of the storage device.

18. The computing method of claim 17, wherein the write confirmation is a completion queue entry.

19. The computing method of claim 13, wherein CRC values of the logic blocks and the data blocks are combined by concatenating the blocks virtually in their original order and calculating a CRC for the concatenated virtual block.

20. The computing method of claim 13, wherein the same CRC algorithm and polynomial are used for generating CRC values for the original data blocks, the logic blocks, and the combined CRC values.

* * * * *